US012679171B2

(12) United States Patent
Kim et al.

(10) Patent No.: US 12,679,171 B2
(45) Date of Patent: Jul. 14, 2026

(54) AIR CONDITIONING SYSTEM FOR MOBILITY

(71) Applicants:Hyundai Motor Company, Seoul (KR); Kia Corporation, Seoul (KR)

(72) Inventors: Ki Mok Kim, Busan (KR); Sang Shin Lee, Suwon-si (KR); Man Ju Oh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 309 days.

(21) Appl. No.: 18/301,404

(22) Filed: Apr. 17, 2023

(65) Prior Publication Data

US 2024/0174051 A1 May 30, 2024

(30) Foreign Application Priority Data

Nov. 30, 2022 (KR) ......................... 10-2022-0164819

(51) Int. Cl.
| | |
|---|---|
| *B60H 1/00* | (2006.01) |
| *B60H 1/14* | (2006.01) |
| *B60H 1/32* | (2006.01) |

(52) U.S. Cl.
CPC ..... *B60H 1/00899* (2013.01); *B60H 1/00278* (2013.01); *B60H 1/00385* (2013.01); *B60H 1/00392* (2013.01); *B60H 1/00885* (2013.01); *B60H 1/00921* (2013.01); *B60H 1/143* (2013.01); *B60H 1/32284* (2019.05);
(Continued)

(58) Field of Classification Search
CPC ........... B60H 2001/00307; B60H 2001/00928; B60H 1/00007; B60H 1/3228; B60H 1/2221; B60Y 2304/01
See application file for complete search history.

(56) References Cited

U.S. PATENT DOCUMENTS

| | | | | |
|---|---|---|---|---|
| 7,600,391 B2 * | 10/2009 | Naik | .................... | B60H 1/3208 |
| | | | | 62/244 |
| 7,789,176 B2 * | 9/2010 | Zhou | .................. | B60H 1/00885 |
| | | | | 180/65.1 |

(Continued)

FOREIGN PATENT DOCUMENTS

| | | | | |
|---|---|---|---|---|
| EP | 3051219 A1 * | 8/2016 | ................ | F24F 1/26 |
| KR | 20140147365 A | 12/2014 | | |

(Continued)

*Primary Examiner* — Ljiljana V. Ciric
(74) *Attorney, Agent, or Firm* — Slater Matsil, LLP

(57) ABSTRACT

An air conditioning system includes a refrigerant circuit including a compressor, a condenser, an expander, and an evaporator, a first coolant line including a first heat exchanger and a first air conditioning heat exchanger, a second coolant line including a second heat exchanger, connected so that coolant in the first coolant line flows by connecting upstream and downstream ends of a second air conditioning heat exchanger to upstream and downstream ends of the first air conditioning heat exchanger, and a first valve selectively controlling the flow of coolant in the first coolant line on the upstream end of the first air conditioning heat exchanger, and a controller controlling the first valve in a heating mode so that coolant cooled by the first heat exchanger in the first coolant line flows to the first air conditioning heat exchanger and to the second air conditioning heat exchanger.

12 Claims, 6 Drawing Sheets

REFERRANT CIRCUIT
............ FIRST COOLANT LINE
—·—·— SECOND COOLANT LINE
————— THIRD COOLANT LINE
-------- FOURTH COOLANT LINE

(52) U.S. Cl.
CPC ............. *B60H 2001/00307* (2013.01); *B60H 2001/00928* (2013.01)

(56) References Cited

U.S. PATENT DOCUMENTS

| | | | | |
|---|---|---|---|---|
| 8,336,319 | B2 * | 12/2012 | Johnston | B60K 11/04 |
| | | | | 62/434 |
| 8,899,062 | B2 * | 12/2014 | Kadle | B60H 1/00342 |
| | | | | 62/333 |
| 9,212,599 | B2 * | 12/2015 | Gao | B60L 58/21 |
| 9,731,578 | B2 * | 8/2017 | Johnston | H01M 10/663 |
| 9,758,010 | B2 * | 9/2017 | Johnston | B60H 1/00385 |
| 9,780,422 | B2 * | 10/2017 | Dunn | B60H 1/00278 |
| 10,040,334 | B2 * | 8/2018 | Graaf | B60H 1/00899 |
| 10,183,544 | B2 * | 1/2019 | Kim | F25B 25/005 |
| 10,308,095 | B2 * | 6/2019 | Oh | B60H 1/32284 |
| 10,308,096 | B2 * | 6/2019 | Oh | B60L 58/26 |
| 10,317,116 | B2 * | 6/2019 | Kuroda | B60H 1/08 |
| 10,350,963 | B2 * | 7/2019 | He | B60H 1/32284 |
| 10,384,512 | B2 * | 8/2019 | Park | B60H 1/2221 |
| 10,532,630 | B2 * | 1/2020 | Lee | B60H 1/00885 |
| 10,562,367 | B2 * | 2/2020 | Oh | B60H 1/00392 |
| 10,634,402 | B2 * | 4/2020 | Kim | B60H 1/00385 |
| 10,766,338 | B2 * | 9/2020 | Oh | B60H 1/00392 |
| 10,814,692 | B2 * | 10/2020 | Kim | B60H 1/32284 |
| 10,875,382 | B2 * | 12/2020 | Ben Ahmed | B60H 1/143 |
| 10,889,157 | B2 * | 1/2021 | Kim | B60H 1/00921 |
| 10,899,191 | B2 * | 1/2021 | Lee | B60H 1/00392 |
| 10,974,566 | B2 * | 4/2021 | Kim | B60H 1/00921 |
| 11,065,935 | B2 * | 7/2021 | Lee | B60H 1/323 |
| 11,110,772 | B2 * | 9/2021 | Oh | B60H 1/00392 |
| 11,117,444 | B2 * | 9/2021 | Kim | B60H 1/08 |
| 11,155,138 | B2 * | 10/2021 | Kim | B60H 1/00428 |
| 11,173,769 | B2 * | 11/2021 | Oh | B60H 1/00278 |
| 11,192,425 | B2 * | 12/2021 | Oh | B60H 1/00007 |
| 11,192,429 | B2 * | 12/2021 | Oh | B60L 58/26 |
| 11,207,940 | B2 * | 12/2021 | Lee | B60H 1/00278 |
| 11,207,941 | B2 * | 12/2021 | Lee | B60H 1/00385 |
| 11,207,946 | B2 * | 12/2021 | Lee | B60H 1/00278 |
| 11,236,926 | B2 * | 2/2022 | Liu | B60H 1/3213 |
| 11,305,611 | B2 * | 4/2022 | Oh | B60L 58/26 |
| 11,325,445 | B2 * | 5/2022 | Kim | B60H 1/00271 |
| 11,358,493 | B2 * | 6/2022 | Cohan | H01M 10/6568 |
| 11,370,265 | B2 * | 6/2022 | Lee | B60H 1/00885 |
| 11,383,577 | B2 * | 7/2022 | Lee | B60R 16/04 |
| 11,383,582 | B2 * | 7/2022 | Lee | B60H 1/00921 |
| 11,390,135 | B2 * | 7/2022 | Lee | B60L 1/02 |
| 11,413,933 | B2 * | 8/2022 | Lee | B60H 1/00392 |
| 11,427,050 | B2 * | 8/2022 | Kim | B60H 1/00428 |
| 11,458,812 | B2 * | 10/2022 | Jeong | B60H 1/00921 |
| 11,505,038 | B2 * | 11/2022 | Kim | B60H 1/00899 |
| 11,529,848 | B2 * | 12/2022 | Kim | B60H 1/3213 |
| 11,541,725 | B2 * | 1/2023 | Oh | H01M 10/613 |
| 11,584,190 | B2 * | 2/2023 | Lee | B60H 1/00885 |
| 11,634,004 | B2 * | 4/2023 | Kim | B60H 1/2221 |
| | | | | 62/259.2 |
| 11,634,008 | B2 * | 4/2023 | Lee | B60H 1/00392 |
| | | | | 165/202 |
| 11,634,009 | B2 * | 4/2023 | Lee | B60H 1/00278 |
| | | | | 165/202 |
| 11,648,819 | B2 * | 5/2023 | Lee | B60H 1/00392 |
| | | | | 165/202 |
| 11,794,547 | B2 * | 10/2023 | Oh | B60H 1/00571 |
| 11,794,550 | B2 * | 10/2023 | Kim | B60H 1/00278 |
| 11,795,973 | B2 * | 10/2023 | Kim | B60H 1/0073 |
| 11,807,066 | B2 * | 11/2023 | Hwang | B60H 1/00878 |
| 11,807,074 | B2 * | 11/2023 | Carlson | B60H 1/00885 |
| 11,850,908 | B2 * | 12/2023 | Benouali | F25B 5/04 |
| 11,858,309 | B2 * | 1/2024 | Song | B60H 1/00278 |
| 11,919,360 | B2 * | 3/2024 | Takagi | B60H 1/32284 |
| 11,981,185 | B2 * | 5/2024 | Oh | B60H 1/3227 |
| 11,987,095 | B2 * | 5/2024 | Kim | H01M 10/613 |
| 11,993,134 | B2 * | 5/2024 | Oh | B60H 1/3229 |
| 12,097,746 | B2 * | 9/2024 | Lee | B60H 1/32284 |
| 12,128,733 | B2 * | 10/2024 | Kim | B60H 1/32281 |
| 12,128,736 | B2 * | 10/2024 | Cho | B60H 1/00278 |
| 12,157,345 | B2 * | 12/2024 | Kim | B60H 1/00278 |
| 12,168,386 | B2 * | 12/2024 | Kim | B60H 1/32284 |
| 12,247,749 | B2 * | 3/2025 | Han | B60H 1/00064 |
| 12,251,984 | B2 * | 3/2025 | Lee | B60H 1/00278 |
| 12,251,987 | B2 * | 3/2025 | Kim | B60H 1/00007 |
| 12,319,115 | B2 * | 6/2025 | Kim | B60H 1/00921 |
| 12,319,124 | B2 * | 6/2025 | Kim | B60H 1/00921 |
| 12,337,657 | B2 * | 6/2025 | Lee | B60H 1/00885 |
| 12,337,661 | B2 * | 6/2025 | Jeong | B60H 1/143 |
| 12,397,607 | B2 * | 8/2025 | Kim | B60H 1/32284 |
| 12,434,538 | B2 * | 10/2025 | Kim | F01P 7/16 |
| 12,447,800 | B2 * | 10/2025 | Oh | B60H 1/00921 |
| 12,508,963 | B2 * | 12/2025 | Jeong | B60N 2/5614 |
| 12,515,496 | B2 * | 1/2026 | Lee | B60H 1/00485 |
| 12,522,044 | B2 * | 1/2026 | Oh | B60H 1/00278 |
| 2006/0053814 | A1 * | 3/2006 | Naik | B60H 1/3208 |
| | | | | 62/241 |
| 2006/0124275 | A1 * | 6/2006 | Gosse | B60H 1/03 |
| | | | | 165/42 |
| 2008/0145731 | A1 * | 6/2008 | Sakajo | H01M 8/04014 |
| | | | | 429/442 |
| 2008/0245503 | A1 * | 10/2008 | Wilson | B60H 1/00371 |
| | | | | 165/42 |
| 2008/0250807 | A1 * | 10/2008 | Park | H05K 7/2059 |
| | | | | 62/259.2 |
| 2010/0126438 | A1 * | 5/2010 | Kim | F28D 15/043 |
| | | | | 165/104.26 |
| 2011/0296855 | A1 * | 12/2011 | Johnston | B60L 50/40 |
| | | | | 62/160 |
| 2012/0090806 | A1 * | 4/2012 | Beschieru | B60H 1/00885 |
| | | | | 165/41 |
| 2012/0304674 | A1 * | 12/2012 | Schwarzkopf | B60H 1/00385 |
| | | | | 62/238.1 |
| 2012/0318012 | A1 * | 12/2012 | Choi | B60H 1/00921 |
| | | | | 62/238.7 |
| 2013/0074525 | A1 * | 3/2013 | Johnston | B60H 1/323 |
| | | | | 62/126 |
| 2013/0269911 | A1 * | 10/2013 | Carpenter | B60H 1/004 |
| | | | | 165/104.19 |
| 2014/0284034 | A1 * | 9/2014 | Kadle | F28D 9/005 |
| | | | | 165/166 |
| 2015/0202986 | A1 * | 7/2015 | Hatakeyama | B60H 1/32 |
| | | | | 165/287 |
| 2015/0258875 | A1 * | 9/2015 | Enomoto | B60K 11/02 |
| | | | | 165/104.31 |
| 2015/0273976 | A1 * | 10/2015 | Enomoto | B60L 3/0046 |
| | | | | 62/243 |
| 2016/0082805 | A1 * | 3/2016 | Graaf | B60H 1/04 |
| | | | | 62/238.7 |
| 2016/0107503 | A1 * | 4/2016 | Johnston | B60H 1/00278 |
| | | | | 165/202 |
| 2016/0107506 | A1 * | 4/2016 | Johnston | B60H 1/00278 |
| | | | | 165/202 |
| 2016/0107508 | A1 * | 4/2016 | Johnston | B60H 1/00278 |
| | | | | 237/12.3 A |
| 2016/0159199 | A1 * | 6/2016 | Kuroda | F25B 6/02 |
| | | | | 165/42 |
| 2016/0339767 | A1 * | 11/2016 | Enomoto | B60H 1/3207 |
| 2017/0174038 | A1 * | 6/2017 | Scheldel | B60H 1/3213 |
| 2017/0253105 | A1 * | 9/2017 | Allgaeuer | B60H 1/143 |
| 2018/0072130 | A1 * | 3/2018 | Kim | B60H 1/32281 |
| 2018/0312034 | A1 * | 11/2018 | Koberstein | B60H 1/00271 |
| 2018/0339570 | A1 * | 11/2018 | Lee | B60H 1/00278 |
| 2019/0168569 | A1 * | 6/2019 | Lee | B60L 58/26 |
| 2019/0176572 | A1 * | 6/2019 | Kim | B60H 1/00428 |
| 2020/0338956 | A1 * | 10/2020 | Oh | B60H 1/32284 |
| 2021/0001686 | A1 * | 1/2021 | Kim | B60H 1/00921 |
| 2021/0331554 | A1 * | 10/2021 | Mancini | B60H 1/00278 |
| 2022/0097487 | A1 * | 3/2022 | Jin | H01M 10/6568 |
| 2022/0266651 | A1 * | 8/2022 | Jeong | B60H 1/2221 |
| 2022/0305885 | A1 * | 9/2022 | Yang | B60H 1/00278 |
| 2022/0324295 | A1 * | 10/2022 | Kim | B60H 1/00278 |
| 2022/0332162 | A1 * | 10/2022 | Lee | B60H 1/00278 |
| 2022/0355648 | A1 * | 11/2022 | Kim | B60H 1/143 |
| 2023/0001763 | A1 * | 1/2023 | Shin | B60H 1/00278 |
| 2023/0017549 | A1 * | 1/2023 | Kim | B60H 1/039 |

(56) References Cited

U.S. PATENT DOCUMENTS

| | | | | |
|---|---|---|---|---|
| 2023/0147794 A1* | 5/2023 | Vaddiraju | ......... | B60H 1/00278 |
| | | | | 165/104.14 |
| 2023/0181956 A1* | 6/2023 | Lee | ......... | A62C 37/40 |
| | | | | 169/47 |
| 2023/0202258 A1* | 6/2023 | Kim | ......... | B60H 1/32281 |
| | | | | 62/160 |
| 2023/0356566 A1* | 11/2023 | Kim | ......... | B60H 1/00007 |
| 2023/0415593 A1* | 12/2023 | Lee | ......... | H01M 10/615 |
| 2024/0001734 A1* | 1/2024 | Mehta | ......... | B60H 1/32281 |
| 2024/0034123 A1* | 2/2024 | Kim | ......... | B60H 1/00278 |
| 2024/0060705 A1* | 2/2024 | Lee | ......... | F25B 1/005 |
| 2024/0109393 A1* | 4/2024 | Oh | ......... | B60H 1/2215 |
| 2024/0162530 A1* | 5/2024 | Lee | ......... | B60H 1/143 |
| 2024/0166089 A1* | 5/2024 | Tsuda | ......... | H01M 10/613 |
| 2024/0174051 A1* | 5/2024 | Kim | ......... | B60H 1/00899 |
| 2024/0181843 A1* | 6/2024 | Cho | ......... | B60H 1/00278 |
| 2024/0181846 A1* | 6/2024 | Lee | ......... | B60H 1/3227 |
| 2024/0190202 A1* | 6/2024 | Jeong | ......... | B60H 1/00278 |
| 2024/0367487 A1* | 11/2024 | Kim | ......... | B60H 1/00878 |
| 2024/0375484 A1* | 11/2024 | Lee | ......... | B60H 1/00485 |
| 2024/0408935 A1* | 12/2024 | Lee | ......... | B60H 1/3227 |
| 2025/0018767 A1* | 1/2025 | Jeong | ......... | B60H 1/32284 |
| 2025/0042222 A1* | 2/2025 | Kim | ......... | B60H 1/3228 |
| 2025/0065693 A1* | 2/2025 | Yang | ......... | B60H 1/00278 |
| 2025/0178410 A1* | 6/2025 | Yun | ......... | B60H 1/00485 |
| 2025/0178414 A1* | 6/2025 | Kim | ......... | B60H 1/00007 |
| 2025/0187405 A1* | 6/2025 | Jeong | ......... | B60H 1/32284 |
| 2025/0187506 A1* | 6/2025 | Jeong | ......... | B60N 2/5614 |
| 2025/0196576 A1* | 6/2025 | Cha | ......... | B60H 1/00885 |
| 2025/0229602 A1* | 7/2025 | Cha | ......... | B60H 1/00907 |
| 2025/0289286 A1* | 9/2025 | Kim | ......... | B60H 1/00392 |
| 2025/0289293 A1* | 9/2025 | Jeong | ......... | B60H 1/00921 |
| 2025/0289347 A1* | 9/2025 | Hong | ......... | H01M 10/6568 |
| 2026/0003374 A1* | 1/2026 | Lee | ......... | B60H 1/0073 |
| 2026/0027864 A1* | 1/2026 | Kim | ......... | B60H 1/00392 |
| 2026/0084488 A1* | 3/2026 | Kim | ......... | B60H 1/00907 |

FOREIGN PATENT DOCUMENTS

| | | | | |
|---|---|---|---|---|
| KR | 102694362 B1 * | 8/2024 | ......... | F25B 41/39 |
| WO | WO-2004074021 A1 * | 9/2004 | ......... | B60H 1/00421 |
| WO | WO-2007052898 A1 * | 5/2007 | ......... | H05K 7/2069 |

* cited by examiner

REFRIGERANT CIRCUIT
FIRST COOLANT LINE
SECOND COOLANT LINE
THIRD COOLANT LINE
FOURTH COOLANT LINE

AIR CONDITIONING SYSTEM FOR MOBILITY

CROSS-REFERENCE TO RELATED APPLICATIONS

This application claims the benefit of Korean Patent Application No. 10-2022-0164819, filed on Nov. 30, 2022, which application is hereby incorporated herein by reference.

TECHNICAL FIELD

The present disclosure relates to an air conditioning system for a mobility.

BACKGROUND

Recently, due to environmental issues of internal combustion engine vehicles, electric vehicles and the like are becoming more popular as eco-friendly vehicles. However, the conventional internal combustion engine vehicles do not require the energy for separate heating because the internal combustion engine vehicles may heat an interior through the waste heat of an engine, but electric vehicles have a problem that heating needs to be performed through separate energy because the engine is not present and thus there is no heat source, thereby reducing fuel efficiency. In addition, the fact is that this point shortens a distance to empty (DTE) of electric vehicles, thereby causing inconvenience such as requiring frequent charging.

Meanwhile, due to the electrification of vehicles, heat management needs of electronic components such as high-voltage batteries and motors as well as interiors of vehicles have been newly added. In other words, in the case of the electric vehicles, each of the indoor space, the battery, and the electronic components has a different need for air conditioning, and there is a need for a technology capable of saving energy as much as possible through an independent response and an efficient collaboration. Therefore, a concept of the integrated heat management of a vehicle has been suggested to increase heat efficiency by integrating the heat management of the entire vehicle while independently performing heat management for each component.

Meanwhile, the refrigerant circulation modules for indoor air conditioning in the electric vehicles circulate refrigerant using electric energy, and the conventional refrigerant circulation modules have a problem of consuming a lot of electric energy and increasing a package.

Therefore, a technology for miniaturizing the refrigerant circulation module and adjusting a temperature of air-conditioning air with coolant through the heat exchange between the refrigerant and the coolant has been developed. This is called a secondary type air conditioning system, and there is a need for a method of securing cooling performance by performing indoor cooling with coolant instead of refrigerant upon indoor cooling.

To this end, a cold core for adjusting the temperature of air conditioning using coolant needs to be formed to be 10% to 30% greater than the cold cores applied to the conventional refrigerant circulation modules. However, when the size of the cold core increases, a problem of increasing the entire package increases, and it is also difficult to sufficiently secure cooling efficiency.

The matters explained as the background art are for the purpose of enhancing the understanding of the background of embodiments of the present disclosure and should not be taken as acknowledging that they correspond to the related art already known to those skilled in the art.

SUMMARY

The present disclosure relates to an air conditioning system for a mobility. Particular embodiments relate to an air conditioning system for a mobility that may improve indoor cooling performance, implement a heat pump and miniaturize a refrigerant circulating module, and perform indoor air conditioning through the heat exchange between a refrigerant and a coolant.

Embodiments of the present disclosure can solve problems in the art, and an exemplary embodiment provides an air conditioning system for a mobility that may improve indoor cooling performance without greatly increasing a cold core, implement a heat pump in miniaturizing a refrigerant circulation module, and perform indoor air conditioning through the heat exchange between a refrigerant and a coolant.

An air conditioning system for a mobility according to embodiments of the present disclosure includes a refrigerant circuit in which a refrigerant circulates and including a compressor, a condenser, an expander, and an evaporator, a first coolant line in which coolant circulates and including a first heat exchanger heat-exchanged with the evaporator of the refrigerant circuit and a first air conditioning heat exchanger configured to adjust a temperature of air conditioning air through the heat exchange of the coolant, a second coolant line in which the coolant circulates and including a second heat exchanger connected so that the coolant of the first coolant line flows by connecting a front or upstream end and a rear or downstream end of a second air conditioning heat exchanger to a front end and a rear end of the first air conditioning heat exchanger, and heat-exchanged with the condenser of the refrigerant circuit, the second air conditioning heat exchanger configured to adjust a temperature of air conditioning air through the heat exchange of the coolant, and a first valve configured to selectively control the flow of the coolant of the first coolant line on the front or upstream end of the first air conditioning heat exchanger, and a controller configured to control the first valve in a heating mode so that the coolant cooled through the first heat exchanger in the first coolant line flows to the first air conditioning heat exchanger and the second air conditioning heat exchanger.

The first coolant line may further include a first water pump, and the second coolant line may further include a second water pump and a coolant heater.

The second coolant line may further include a first outdoor heat exchanger and a second valve, and the coolant passing through the second heat exchanger may selectively flow to the second air conditioning heat exchanger side or the first outdoor heat exchanger side by a second valve.

The second coolant line may further include a third valve configured to allow the coolant passing through the second air conditioning heat exchanger on the rear or downstream end of the second air conditioning heat exchanger to selectively flow to the first coolant line side or the second heat exchanger side.

The controller may control the first valve in the cooling mode so that the coolant cooled through the first heat exchanger in the first coolant line flows to the first air conditioning heat exchanger and the second air conditioning heat exchanger and may control the third valve so that the coolant passing through the second air conditioning heat exchanger is recirculated to the first coolant line.

The controller may control the first valve in the heating mode so that the coolant heated through the second heat exchanger in the second coolant line flows to the second air conditioning heat exchanger and may control the third valve so that the coolant passing through the second air conditioning heat exchanger is recirculated to the second heat exchanger.

The first coolant line may further include a fourth valve and a fifth valve respectively provided on front or upstream ends and rear or downstream ends of the second outdoor heat exchanger and the first heat exchanger, and the coolant passing through the first heat exchanger may selectively circulate to the first air conditioning heat exchanger side or the second outdoor heat exchanger side by the fourth valve and the fifth valve.

The air conditioning system may further include a third coolant line connected to the fourth valve and the fifth valve of the first coolant line, wherein the third coolant line may include a battery.

The second coolant line may be branched from a branch pipe between the second heat exchanger and the first valve and connected to the third coolant line via a sixth valve on a front or upstream end of the battery.

The third valve may be formed as a 4-way valve for selectively circulating the coolant to the second heat exchanger side, the second air conditioning heat exchanger side, the battery side, and the first heat exchanger side.

The third valve may be formed as a 3-way valve for selectively circulating the coolant to the second heat exchanger side, the second air conditioning heat exchanger side, and the battery side, and the second coolant line may be further provided with a branch line connected to the fifth valve of the first coolant line on the rear or downstream end of the second air conditioning heat exchanger, and the branch line may include a seventh valve.

The air conditioning system may further include a fourth coolant line branched from the first coolant line, wherein the fourth coolant line may include an electronic component, a third outdoor heat exchanger, and an eighth valve, and the coolant may selectively flow to the electronic component or a third outdoor heat exchanger by the eighth valve.

The air conditioning system for the mobility formed in the above structure can improve indoor cooling performance without increasing the size of the cold core, miniaturize the refrigerant circulation module, and perform the indoor air conditioning through the heat exchange between a refrigerant and a coolant.

In other words, the first indoor air conditioning heat exchanger for indoor cooling and the second indoor air conditioning heat exchanger for indoor heating are provided, and the cooled coolant flows to both of the first indoor air conditioning heat exchanger and the second indoor air conditioning heat exchanger upon indoor cooling, and thus it is possible to increase the heat exchange area of the air, thereby improving cooling performance.

In addition, it is possible to perform the temperature management of the battery and the electronic components and implement the heat pump accordingly, thereby securing energy efficiency.

BRIEF DESCRIPTION OF THE DRAWINGS

The above and other objects, features and other advantages of embodiments of the present disclosure will be clearly understood from the following detailed description when taken in conjunction with the accompanying drawings, in which.

DETAILED DESCRIPTION OF ILLUSTRATIVE EMBODIMENTS

Figure 1:
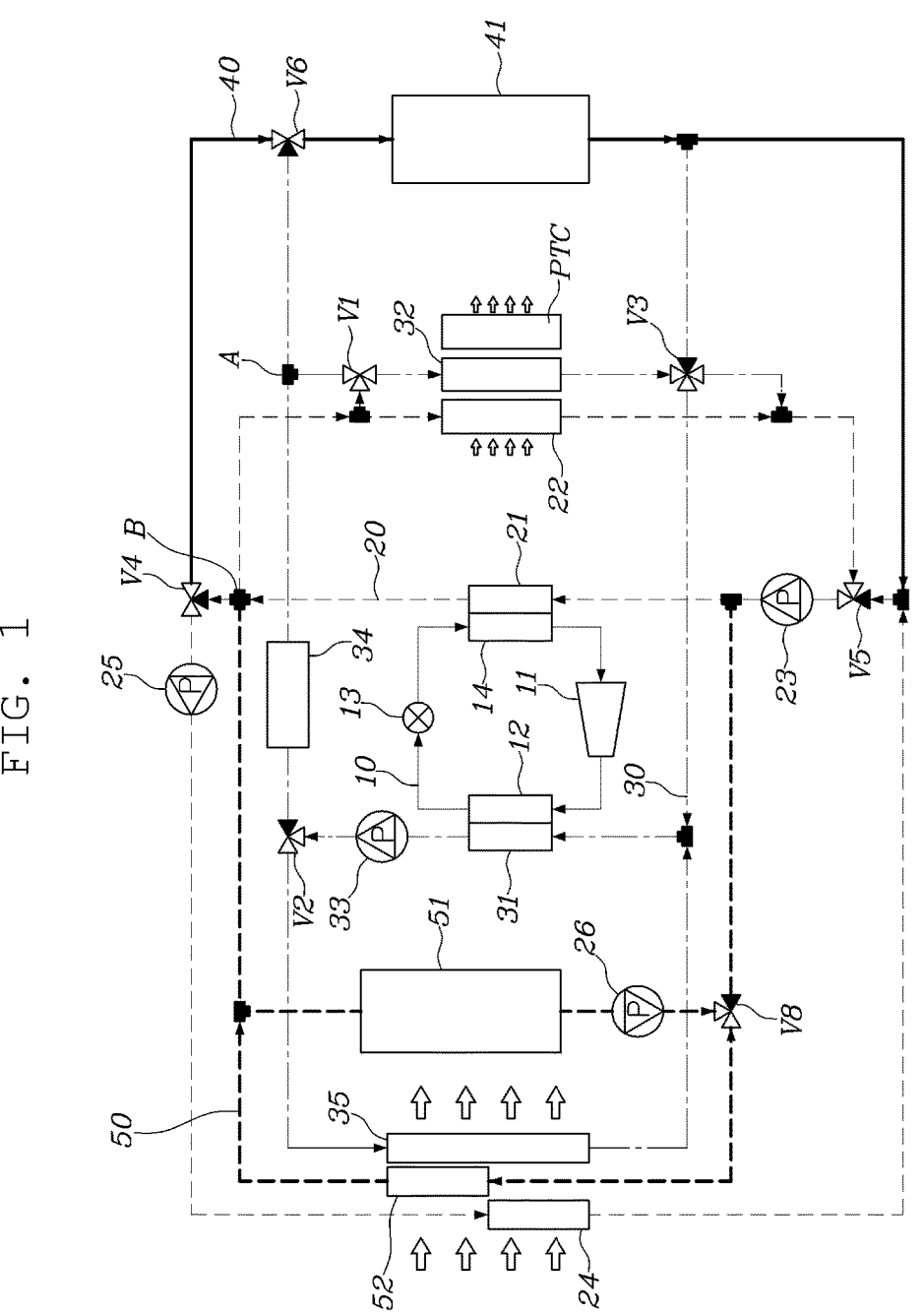
FIG. 1 is a view showing an air conditioning system for a mobility according to one embodiment of the present disclosure.

Hereinafter, embodiments disclosed in the present specification will be described in detail with reference to the accompanying drawings, and the same or similar components are given the same reference numerals regardless of the figure, and overlapping descriptions thereof will be omitted.

The suffixes "module" and "unit" for components used in the following description are given or used interchangeably in consideration of only the ease of preparing the specification, and do not have distinct meanings or roles by themselves.

In describing the embodiments disclosed in the present specification, when it is determined that detailed descriptions of related known technologies may obscure the gist of the embodiments disclosed in the present specification, detailed descriptions thereof will be omitted. In addition, it should be understood that the accompanying drawings are only for easy understanding of the embodiments disclosed in the present specification, and the technical spirit disclosed herein is not limited by the accompanying drawings, and includes all changes, equivalents, or substitutes included in the spirit and technical scope of the present disclosure.

Terms including ordinal numbers such as first and second may be used to describe various components, but the components are not limited by the terms. The terms are used only for the purpose of distinguishing one component from another.

When a certain component is described as being "connected" or "coupled" to another component, it should be understood that it may also be directly connected or coupled to another component, but other components may be present therebetween. On the other hand, it should be understood that when a certain component is described as being "directly connected" or "directly coupled" to another component, other components are not present therebetween.

The singular expression includes the plural expression unless the context clearly dictates otherwise.

In the specification, it should be understood that terms such as "comprises" or "have" are intended to specify that the features, numbers, steps, operations, components, parts, or combinations thereof described in the specification are present, but do not preclude the possibility of the presence or addition of one or more other features, numbers, steps, operations, components, parts, or combinations thereof.

The controller may include a communication device for performing communication with other controllers or sensors to control a function in charge, a memory for storing an operating system or logic commands and input/output information, and one or more processors for performing determination, calculation, decision, and the like necessary for controlling the function in charge.

Hereinafter, an air conditioning system for a mobility according to preferred embodiments of the present disclosure will be described with reference to the accompanying drawings.

Figure 2:
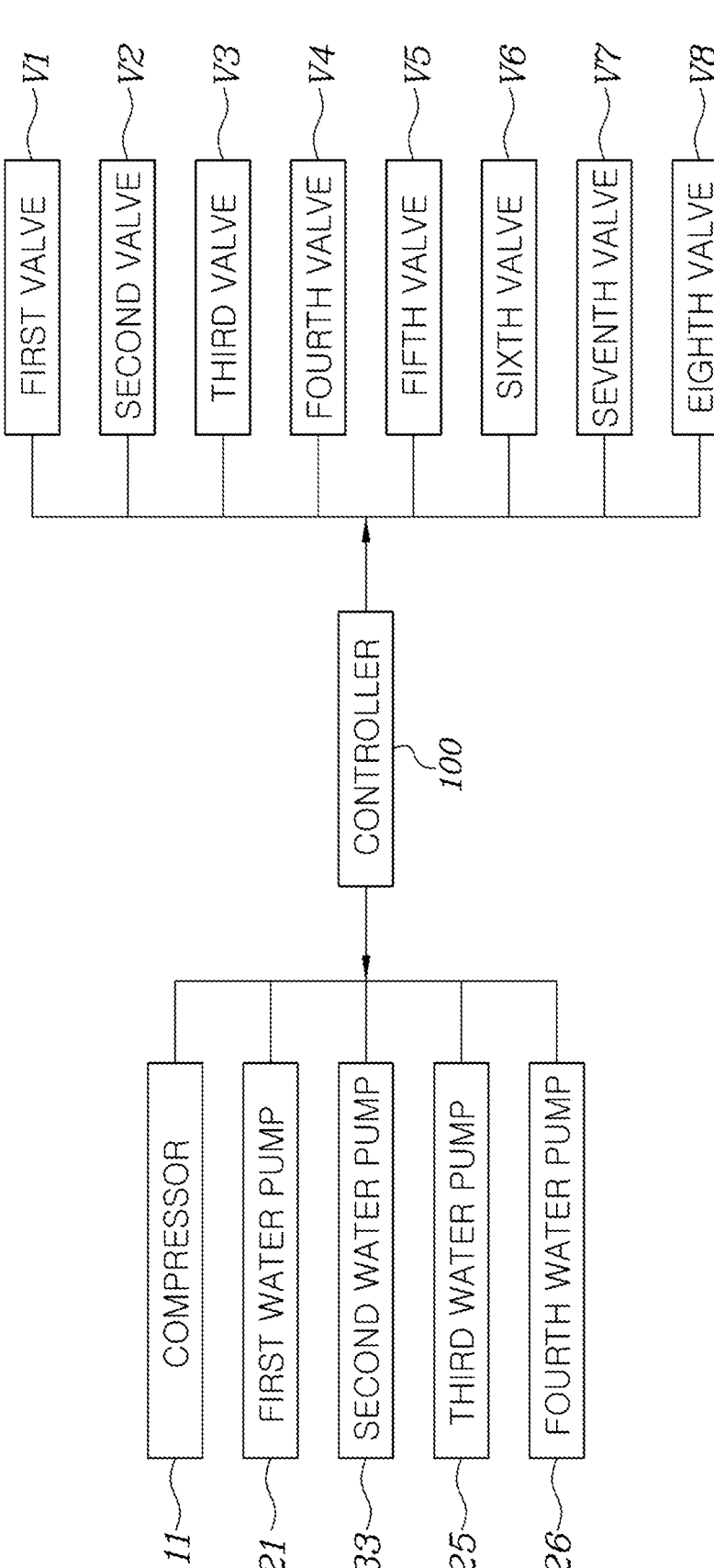
FIG. 2 is a configuration diagram of the air conditioning system for a mobility shown in FIG. 1.

FIG. 1 is a view showing an air conditioning system for a mobility according to one embodiment of the present disclosure, and FIG. 2 is a configuration diagram of the air conditioning system for a mobility shown in FIG. 1.

Figure 3:
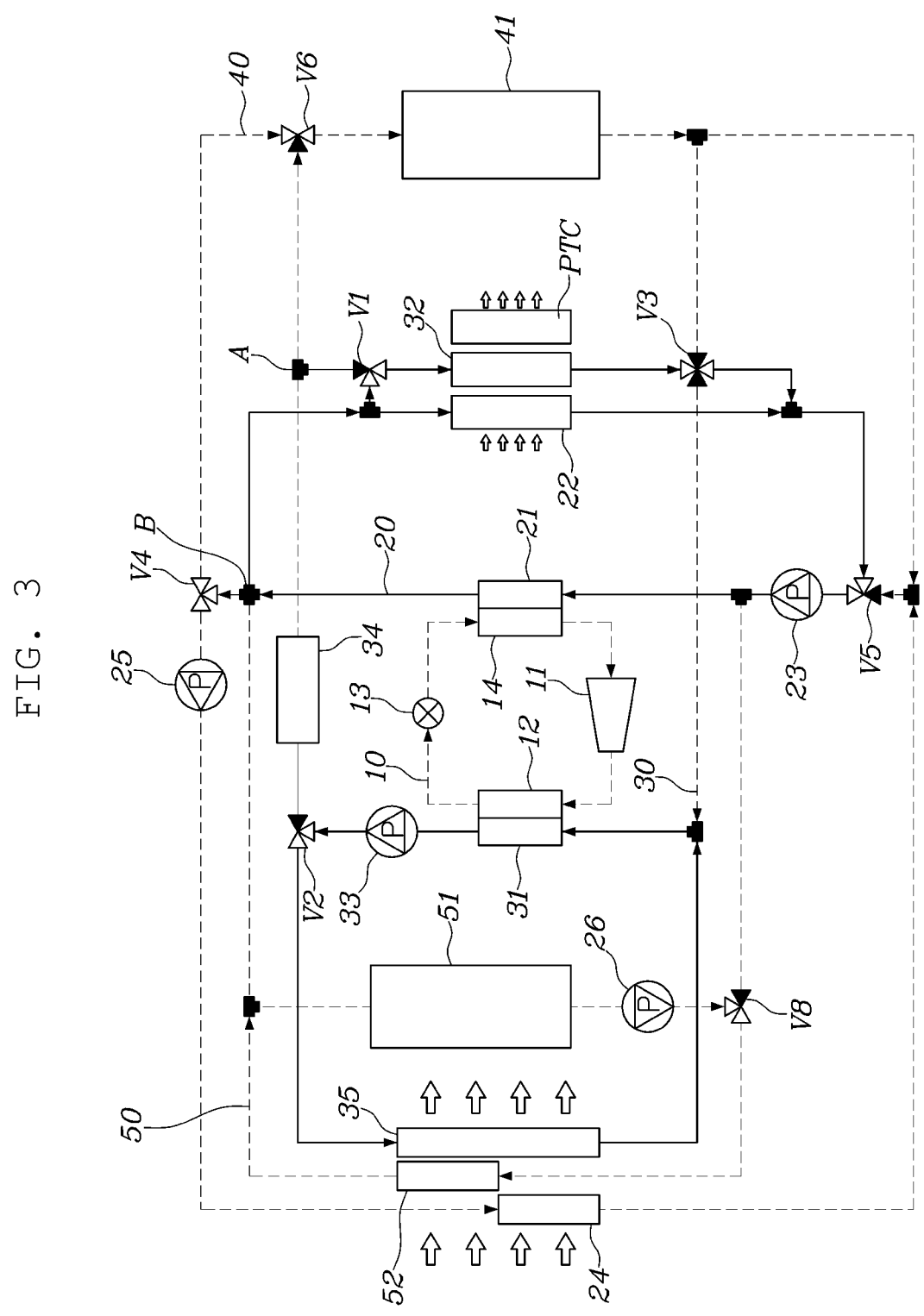
FIG. 3 is a view showing a cooling mode of the air conditioning system for a mobility shown in FIG. 1.
Figure 4:
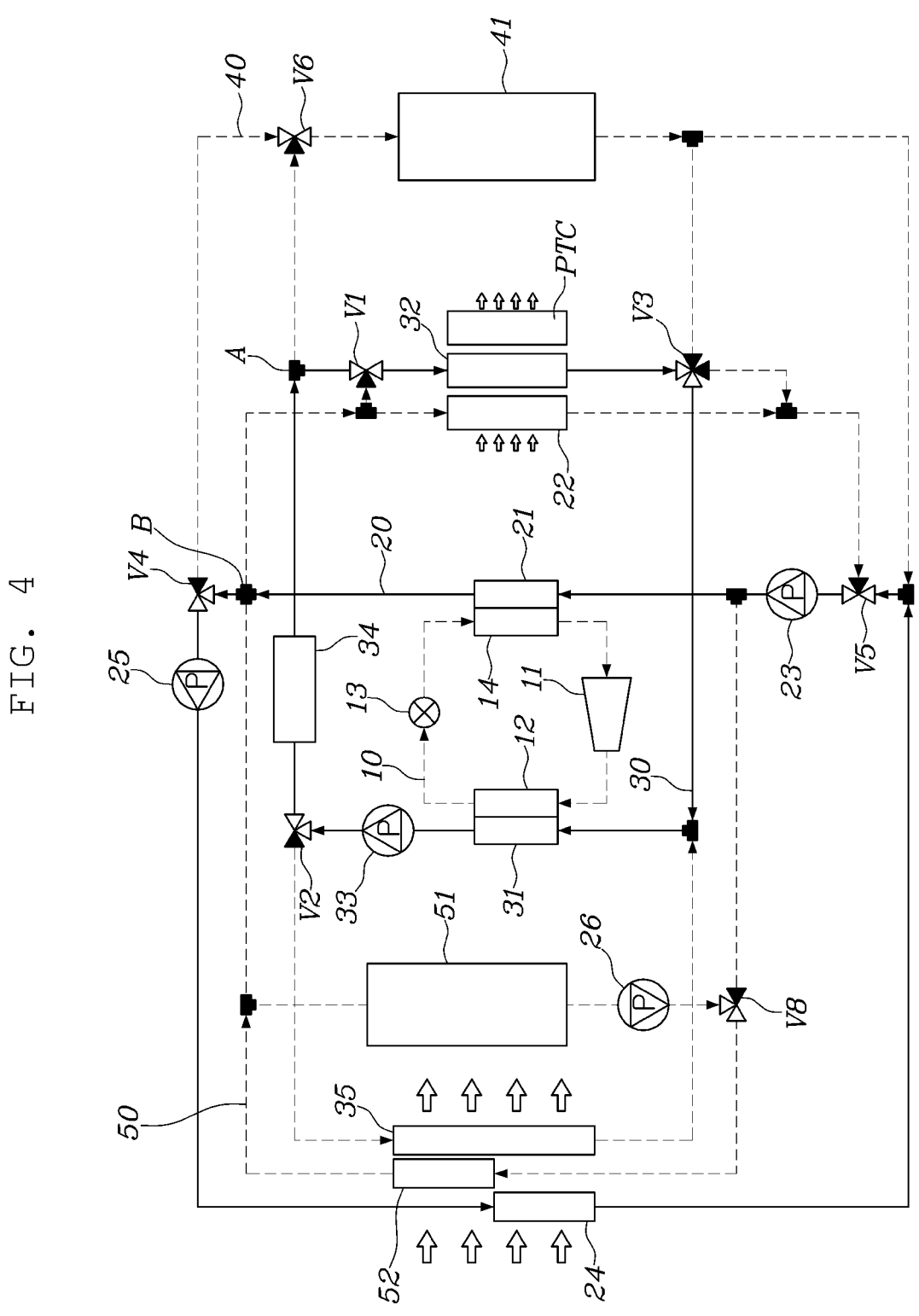
FIG. 4 is a view showing a heating mode of the air conditioning system for a mobility shown in FIG. 1.

Meanwhile, FIG. 3 is a view showing a cooling mode of the air conditioning system for a mobility shown in FIG. 1, and FIG. 4 is a view showing a heating mode of the air conditioning system for a mobility shown in FIG. 1.

Figure 5:
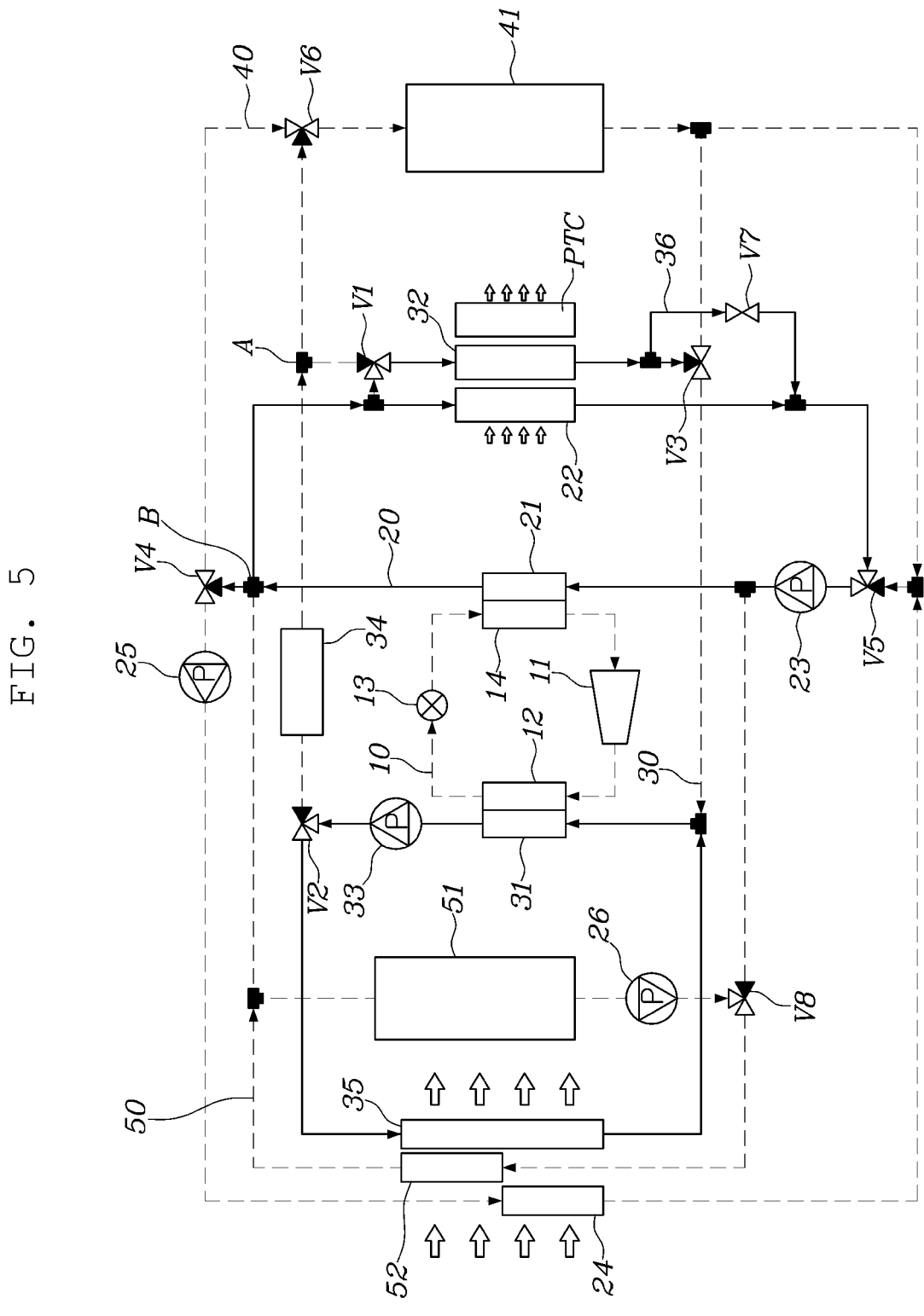
FIG. 5 is a view showing a cooling mode of an air conditioning system for a mobility according to another embodiment of the present disclosure.
Figure 6:
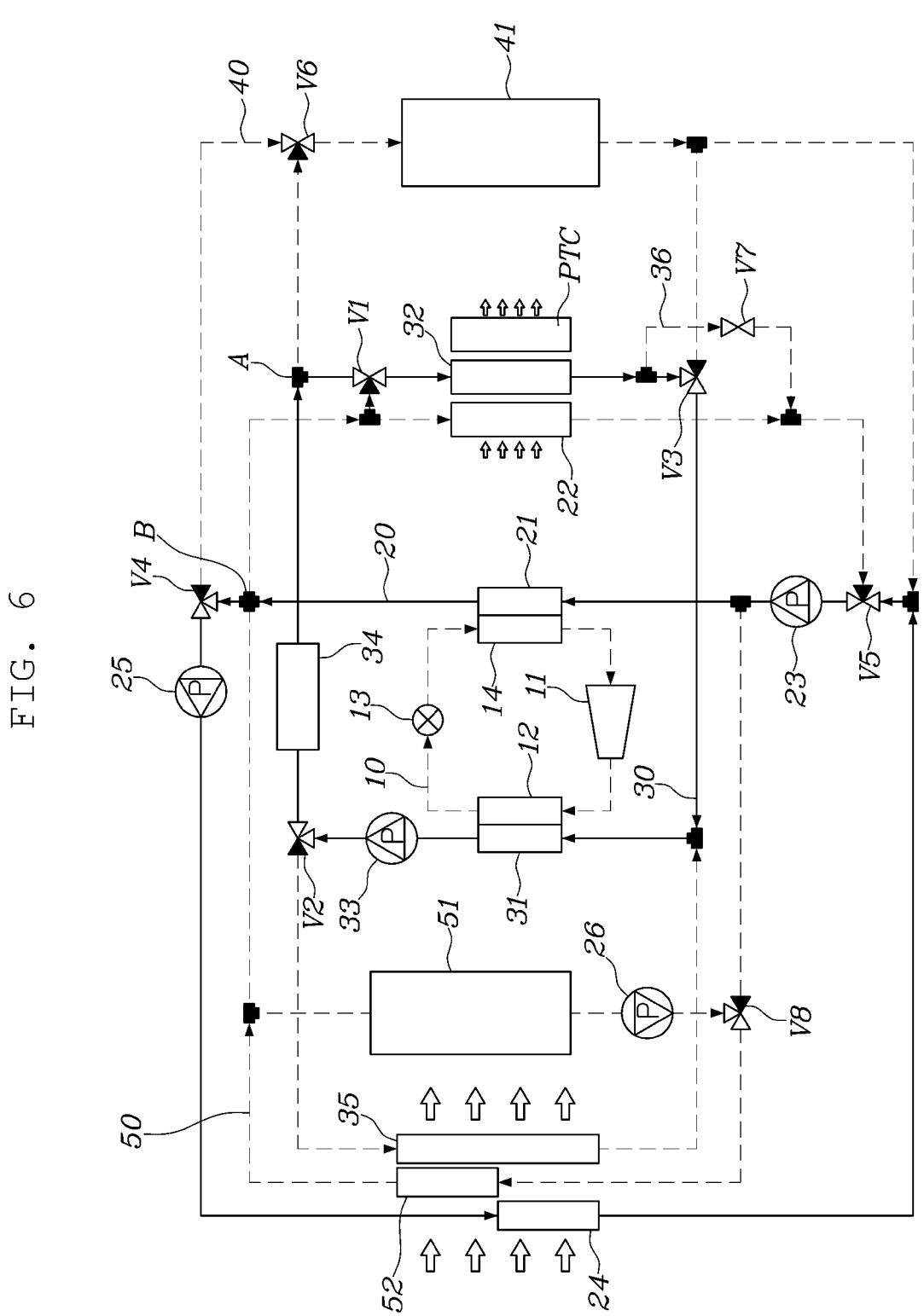
FIG. 6 is a view showing a heating mode of the air conditioning system for a mobility according to another embodiment of the present disclosure.

FIG. 5 is a view showing a cooling mode of an air conditioning system for a mobility according to another embodiment of the present disclosure, and FIG. 6 is a view showing a heating mode of the air conditioning system for a mobility according to another embodiment of the present disclosure.

As shown in FIGS. 1 and 2, the air conditioning system for a mobility according to embodiments of the present disclosure includes a refrigerant circuit 10 in which refrigerant circulates and including a compressor 11, a condenser 12, an expander 13, and an evaporator 14, a first coolant line 20 in which coolant circulates and including a first heat exchanger 21 heat-exchanged with the evaporator 14 of the refrigerant circuit 10 and a first air conditioning heat exchanger 22 for adjusting a temperature of air conditioning air through the heat exchange of the coolant, and a second coolant line 30 in which the coolant circulates and including a second heat exchanger 31 connected so that the coolant of the first coolant line 20 may flow by connecting a front or upstream end and rear or downstream end of a second air conditioning heat exchanger 32 to a front or upstream end and rear or downstream end of the first air conditioning heat exchanger 22, and heat-exchanged with the condenser 12 of the refrigerant circuit 10, the second air conditioning heat exchanger 32 for adjusting the temperature of the air conditioning air through the heat exchange of the coolant, and a first valve V1 for selectively controlling the flow of the coolant of the first coolant line 20 on the front or upstream end of the first air conditioning heat exchanger 22.

According to embodiments of the present disclosure, the temperature of the coolant is adjusted through the heat exchange between the refrigerant circulated in the refrigerant circuit 10 and the coolant circulated in the first coolant line 20 and the second coolant line 30, and the temperature of the air conditioning air provided to the indoor area is adjusted by the heated coolant so that cooling air or heating air is formed.

However, conventionally, one cold core for indoor cooling and one heat core for indoor heating are disposed, and in the case of the indoor heating, it is easy to secure a heat source for heating as a separate positive temperature coefficient (PTC) heater is provided, but in the case of the indoor cooling, it is not possible to sufficiently perform the heat exchange for cooling using only the cold core. Therefore, when an area of the cold core is increased, a problem arises due to the increase in a package, and it is difficult to secure sufficient cooling performance by only increasing the area simply.

Therefore, according to one embodiment of the present disclosure, there are provided the refrigerant circuit 10 in which the refrigerant circulates and the first coolant line 20 and the second coolant line 30 in which the temperature of the coolant is adjusted through the heat exchange with the refrigerant of the refrigerant circuit 10 to form cooling air conditioning air or heating air conditioning.

Here, the first coolant line 20 includes the first heat exchanger 21 heat-exchanged with the evaporator 14 of the refrigerant circuit 10 so that the coolant is cooled and the first air conditioning heat exchanger 22 for adjusting the temperature of the air conditioning air through the heat exchange of the coolant, and thus as the coolant cooled through the first heat exchanger 21 flows to the first air conditioning heat exchanger 22, the air conditioning air may be cooled in the first air conditioning heat exchanger 22 and provided to the indoor area.

In addition, the second coolant line 30 includes the second heat exchanger 31 heat-exchanged with the condenser 12 of the refrigerant circuit 10 so that the coolant is heated and the second air conditioning heat exchanger 32 for adjusting the temperature of the air conditioning air through the heat exchange of the coolant, and thus as the coolant heated through the second heat exchanger 31 flows to the second air conditioning heat exchanger 32, the air conditioning air may be heated in the second air conditioning heat exchanger 32 and provided to the indoor area.

In particular, in the case of the second coolant line 30, the front or upstream end and rear or downstream end of the second air conditioning heat exchanger 32 are connected to the front or upstream end and rear or downstream end of the first air conditioning heat exchanger 22 so that the coolant of the first coolant line 20 may flow to the second air conditioning heat exchanger 32. In addition, the second coolant line 30 is provided with the first valve V1 for selectively controlling the flow of the coolant of the first coolant line 20 on the front or upstream end of the first air conditioning heat exchanger 22, and thus the coolant of the first coolant line 20 may selectively flow to the second coolant line 30 as the opening and closing operation of the first valve V1.

Therefore, when receiving a command according to a cooling mode, a controller 100 controls the first valve V1 so that the coolant flows from the first coolant line 20 to the second coolant line 30, and thus the coolant cooled through the first heat exchanger 21 of the first coolant line 20 flows to the first air conditioning heat exchanger 22, and some of the coolant also flows to the second air conditioning heat exchanger 32 of the second coolant line 30. As described above, as the coolant flows to the first air conditioning heat exchanger 22 and the second air conditioning heat exchanger 32, the heat exchange area increases, and thus cooling air is formed in both of the first air conditioning heat exchanger 22 and the second air conditioning heat exchanger 32, thereby improving cooling performance.

In addition, as the first air conditioning heat exchanger 22 and the second air conditioning heat exchanger 32 are disposed in an air conditioning housing in a direction in which the air conditioning air flows, the air conditioning air passes through both of the first air conditioning heat exchanger 22 and the second air conditioning heat exchanger 32, thereby securing cooling performance through sufficient heat exchange.

As described above, according to embodiments of the present disclosure, the first air conditioning heat exchanger 22 and the second air conditioning heat exchanger 32 do not perform any one of cooling and heating air conditioning functions, but as the second air conditioning heat exchanger 32 may selectively perform cooling or heating, it is possible to maintain heating performance and additionally secure cooling performance.

Specifically describing embodiments of the present disclosure described above, a first water pump 23 may be further provided in the first coolant line 20 and thus the coolant may circulate in the first coolant line 20, and the second coolant line 30 may be provided with a second water pump 33 and thus the coolant may circulate in the second coolant line 30. In addition, as the coolant heated through the second heat exchanger 31 is provided to the second air conditioning heat exchanger 32 to form heating air, a coolant heater 34 may be further provided in the second coolant line 30 so that the insufficient heat source of the coolant may be supplemented.

Meanwhile, the second coolant line 30 may further include a first outdoor heat exchanger 35 and a second valve V2, and the coolant passing through the second heat exchanger 31 by the second valve V2 may selectively flow to the second air conditioning heat exchanger 32 side or the first outdoor heat exchanger 35 side.

As described above, a separate line in which the first outdoor heat exchanger 35 is provided may be branched from the second coolant line 30, and the coolant may flow to the first outdoor heat exchanger 35 according to the opening and closing operation of the second valve V2. The first outdoor heat exchanger 35 may be formed as a radiator and is provided to adjust the temperature of the coolant by being heat-exchanged with external air.

Therefore, the controller 100 allows the second heat exchanger 31 to exchange heat between the coolant and the refrigerant through the condenser 12 of the refrigerant circuit 10 in the second coolant line 30 in the cooling mode, and the heated coolant is cooled through the first outdoor heat exchanger 35, and thus the temperature management of the refrigerant may be performed through the heat exchange between the coolant and the refrigerant.

Meanwhile, the second coolant line 30 further includes a third valve V3 for allowing the coolant passing through the second air conditioning heat exchanger 32 on the rear or downstream end of the second air conditioning heat exchanger 32 to selectively flow to the first coolant line 20 side or the second heat exchanger 31 side.

The third valve V3 is provided on the rear or downstream end of the second air conditioning heat exchanger 32 in the second coolant line 30 so that the coolant passing through the second air conditioning heat exchanger 32 is recirculated to the first coolant line 20 or recirculated to the second heat exchanger 31.

In other words, since the coolant cooled through the first heat exchanger 21 in the first coolant line 20 flows to the second air conditioning heat exchanger 32 or the coolant heated through the second heat exchanger 31 in the second coolant line 30 flows to the second air conditioning heat exchanger 32 according to the cooling mode or the heating mode, a circulating direction of the coolant according to the cooling mode or the heating mode needs to be changed.

Therefore, the third valve V3 may be opened or closed by the cooling mode control of the controller 100 so that the coolant cooled through the first heat exchanger 21 in the first coolant line 20 flows to the second air conditioning heat exchanger 32 and is recirculated back to the first coolant line 20.

In addition, the third valve V3 may be opened and closed by the heating mode control of the controller 100 so that the coolant heated through the second heat exchanger 31 in the second coolant line 30 flows to the second air conditioning heat exchanger 32 and is recirculated back to the second heat exchanger 31 side.

As described above, according to embodiments of the present disclosure, the opening and closing operations of the first valve V1 and the third valve V3 may be controlled according to the cooling mode or the heating mode, thereby performing efficient cooling and heating according to each air conditioning mode.

More specifically, the controller 100 controls the first valve V1 in the cooling mode so that the coolant cooled through the first heat exchanger 21 in the first coolant line 20 flows to the first air conditioning heat exchanger 22 and the second air conditioning heat exchanger 32 and controls the third valve V3 so that the coolant passing through the second air conditioning heat exchanger 32 is recirculated to the first coolant line 20.

As shown in FIG. 3, in the cooling mode, the first coolant line 20 side and the second air conditioning heat exchanger 32 side among a plurality of ports of the first valve V1 are opened, and thus the coolant of the first coolant line 20 flows to the second coolant line 30 and the coolant cooled through the first heat exchanger 21 flows to the second air conditioning heat exchanger 32.

In addition, the second air conditioning heat exchanger 32 side and the first coolant line 20 side among a plurality of ports of the third valve V3 are opened, and thus the coolant passing through the second air conditioning heat exchanger 32 is recirculated back to the first coolant line 20.

Therefore, the flow in which the coolant cooled through the first heat exchanger 21 flows and is recirculated to the first air conditioning heat exchanger 22 and the second air conditioning heat exchanger 32 may be formed, and air conditioning air may be cooled through the first air conditioning heat exchanger 22 and the second air conditioning heat exchanger 32.

In this case, in order to manage a refrigerant temperature in the refrigerant circuit 10, the coolant heated through the second heat exchanger 31 in the second coolant line 30 is cooled through the first outdoor heat exchanger 35.

Meanwhile, the controller 100 controls the first valve V1 in the heating mode so that the coolant heated through the second heat exchanger 31 in the second coolant line 30 flows to the second air conditioning heat exchanger 32 and controls the third valve V3 so that the coolant passing through the second air conditioning heat exchanger 32 is recirculated to the second heat exchanger 31.

As shown in FIG. 4, in the heating mode, the second heat exchanger 31 side and the second air conditioning heat exchanger 32 side of the second coolant line 30 among a plurality of ports of the first valve V1 are opened, and thus the coolant heated through the second heat exchanger 31 flows to the second air conditioning heat exchanger 32.

In addition, the second air conditioning heat exchanger 32 side and the second heat exchanger 31 side of the second coolant line 30 among the plurality of ports of the third valve V3 are opened, and thus the coolant passing through the second air conditioning heat exchanger 32 is recirculated back to the second heat exchanger 31.

Therefore, the flow in which the coolant heated through the second heat exchanger 31 flows and is recirculated to the second air conditioning heat exchanger 32, and the air conditioning air may be heated through the second air conditioning heat exchanger 32.

Here, the first coolant line 20 further includes a fourth valve V4 and a fifth valve V5 respectively provided on front or upstream ends and rear or downstream ends of the second outdoor heat exchanger 24 and the first heat exchanger 21, and the coolant passing through the first heat exchanger 21 is selectively recirculated to the first air conditioning heat exchanger 22 side or the second outdoor heat exchanger 24 side by the fourth valve V4 and the fifth valve V5. Here, a third water pump 25 may be further provided to smoothly circulate the coolant to the second outdoor heat exchanger 24.

As described above, a separate line in which the second outdoor heat exchanger 24 is provided may be branched from the first coolant line 20, and the coolant may flow to the second outdoor heat exchanger 24 according to the opening and closing operations of the fourth valve V4 and the fifth valve V5. Therefore, a temperature of the coolant flowing to the first coolant line 20 and a third coolant line 40 in which a battery 41 to be described below is provided may be adjusted through the second outdoor heat exchanger 24.

Therefore, the controller 100 allows the first heat exchanger 21 to exchange heat between the coolant and the refrigerant through the evaporator 14 of the refrigerant circuit 10 in the first coolant line 20 in the heating mode, and the cooled coolant is heat-exchanged with the air through the second outdoor heat exchanger 24, and thus the temperature management of the refrigerant may be performed through the heat exchange between the coolant and the refrigerant.

Meanwhile, the air conditioning system for a mobility may further include the third coolant line 40 connected to the fourth valve V4 and the fifth valve V5 of the first coolant line 20, and the third coolant line 40 may include the battery 41.

The third coolant line 40 may be connected to the fourth valve V4 and the fifth valve V5 so that the coolant of the first coolant line 20 may flow by the opening and closing operations of the fourth valve V4 and the fifth valve V5.

In addition, the second coolant line 30 may be branched from a branch pipe A between the second heat exchanger 31 and the first valve V1 and connected to the third coolant line 40 via the sixth valve V6 on a front or upstream end of the battery 41.

In other words, in the third coolant line 40, the coolant of the first coolant line 20 may flow to the battery 41, or the coolant of the second coolant line 30 may flow to the battery 41 by the opening and closing operation of the sixth valve V6. At this time, since the opening and closing operations of the fourth valve V4 and the fifth valve V5 are controlled together, the coolant of the first coolant line 20 and the second coolant line 30 may selectively flow to the third coolant line 40.

Therefore, since the coolant of the first coolant line 20 and the second coolant line 30 may selectively flow to the battery 41, the temperature management according to heating or cooling may be performed. In addition, it is possible to implement the heat pump through the flow of the coolant heat-exchanged with the battery 41.

Meanwhile, the air conditioning system for a mobility may further include a fourth coolant line 50 branched from the first coolant line 20, the fourth coolant line 50 may include an electronic component 51, a third outdoor heat exchanger 52, and an eighth valve V8, and coolant may selectively flow to the electronic component 51 or the third outdoor heat exchanger 52 by the eighth valve V8. In addition, a fourth water pump 26 may be further provided in the fourth coolant line 50 in order to smoothly circulate the coolant.

The fourth coolant line 50 may be branched from the first coolant line 20, and the coolant of the first coolant line 20 may flow to the electronic component 51 or the third outdoor heat exchanger 52 by an opening and closing operation of the eighth valve V8.

Here, the fourth coolant line 50 may be branched from the first coolant line 20 via a branch pipe B, a line where the electronic component 51 is provided and a line where the third outdoor heat exchanger 52 is provided are disposed in parallel, and the coolant selectively flows to the electronic component 51 or the third outdoor heat exchanger 52 by the eighth valve V8.

Therefore, the temperature management of the electronic component 51 may be performed as the coolant of the first coolant line 20 selectively flows, and the temperature of the coolant may be managed by the third outdoor heat exchanger 52 for performing the heat exchange between external air and the coolant. In addition, it is possible to implement the heat pump by the temperature management of the coolant through the electronic component 51 and the third outdoor heat exchanger 52.

Meanwhile, according to embodiments of the present disclosure, the third valve V3 for adjusting the flow of the coolant flowing to the second air conditioning heat exchanger 32 may be applied in various embodiments.

As shown in FIG. 1, the third valve V3 may be formed as a 4-way valve for selectively circulating coolant to the second heat exchanger 31 side, the second air conditioning heat exchanger 32 side, the battery 41 side, and the first heat exchanger 21 side.

As described above, the third valve V3 is formed as the 4-way valve and provided in the second coolant line 30. Therefore, the third valve V3 includes a port of the second heat exchanger 31 side, a port of the second air conditioning heat exchanger 32 side, a port of the battery 41 side, and a port of the first heat exchanger 21 side, and the coolant passing through the second air conditioning heat exchanger may flow to the second heat exchanger 31 or the first heat exchanger 21 of the first coolant line 20 through an opening and closing operation of each port. In addition, since the coolant passing through the battery 41 in the third coolant line 40 may also flow to the second coolant line 30, it is possible to implement the heat pump through the flow of the coolant passing through the battery 41.

Meanwhile, in another embodiment, as shown in FIG. 5, the third valve V3 may be formed as a 3-way valve for selectively circulating coolant to the second heat exchanger 31 side, the second air conditioning heat exchanger 32 side, and the battery 41 side, and a branch line 36 connected to the fifth valve V5 of the first coolant line 20 on the rear or downstream end of the second air conditioning heat exchanger 32 may be further provided in the second coolant line 30, and a seventh valve V7 may be provided in the branch line 36.

As described above, the third valve V3 is formed as the 3-way valve and provided in the second coolant circuit. The third valve V3 includes a port of the second heat exchanger 31 side, a port of the second air conditioning heat exchanger 32 side, and a port of the battery 41 side, and the coolant passing through the second air conditioning heat exchanger flows to the second heat exchanger 31, or the coolant passing through the battery 41 in the third coolant line 40 flows by an opening and closing operation of each port.

In particular, the second coolant line 30 may include the branch line 36 branched between the rear or downstream end of the second air conditioning heat exchanger 32 and the third valve V3 and connected to the first coolant line 20, and a cooling medium may flow to the branch line 36 by an opening and closing operation of the seventh valve V7.

As described above, in the corresponding embodiment, by configuring the branch line 36 in the second coolant line 30, the third valve V3 may be provided in the second coolant line 30, thereby reducing a package of a valve module and securing a degree of freedom of installation positions of the branch line 36 and the seventh valve V7.

Therefore, when cooling air is formed through the second air conditioning heat exchanger 32, the coolant flow in which the coolant passing through the second air conditioning heat exchanger 32 is recirculated to the first coolant line 20 through the branch line 36 may be formed.

In other words, in the cooling mode, as shown in FIG. 5, the first coolant line 20 side and the second air conditioning heat exchanger 32 side among the plurality of ports of the first valve V1 are opened, and thus the coolant of the first coolant line 20 flows to the second coolant line 30, and the coolant cooled through the first heat exchanger 21 flows to the second air conditioning heat exchanger 32.

In addition, as the port of the second air conditioning heat exchanger 32 side of the third valve V3 is closed, the coolant passing through the second air conditioning heat exchanger 32 may flow to the branch line 36, and the seventh valve V7 is opened and the coolant flowing to the branch line 36 may be recirculated to the first coolant line.

Meanwhile, in the heating mode, as shown in FIG. 6, the second heat exchanger 31 side of the second coolant line 30 and the second air conditioning heat exchanger 32 side among the plurality of ports of the first valve V1 are opened, and thus the coolant heated through the second heat exchanger 31 flows to the second air conditioning heat exchanger 32.

In addition, the port of the second air conditioning heat exchanger 32 side and the port of the second heat exchanger 31 side of the third valve V3 are opened, and thus the coolant passing through the second air conditioning heat exchanger 32 may be recirculated in the second coolant line 30 to flow to the second heat exchanger 31.

The air conditioning system for the mobility formed in the above structure can improve indoor cooling performance without increasing the size of the cold core by miniaturizing the refrigerant circulation module and performing the indoor air conditioning through the heat exchange between refrigerant and coolant.

In other words, the first indoor air conditioning heat exchanger for indoor cooling and the second indoor air conditioning heat exchanger for indoor heating are provided, and the cooled coolant flows to both of the first indoor air conditioning heat exchanger and the second first indoor air conditioning heat exchanger upon indoor cooling, and thus it is possible to increase the heat exchange area of the air, thereby improving cooling performance.

In addition, it is possible to perform the temperature management of the battery 41 and the electronic component 51 and implement the heat pump accordingly, thereby securing energy efficiency.

Although the present disclosure has been shown and described with reference to specific embodiments, it will be obvious to those skilled in the art that the present disclosure may be variously improved and changed without departing from the technical spirit of the present disclosure provided by the appended claims.

What is claimed is:

1. An air conditioning system comprising:
a refrigerant circuit configured to circulate a refrigerant, the refrigerant circuit comprising a compressor, a condenser, an expander, and an evaporator;
a first coolant line configured to circulate a coolant, the first coolant line comprising a first heat exchanger configured and positioned to exchange heat with the evaporator of the refrigerant circuit and a first air conditioning heat exchanger configured to adjust the temperature of air conditioning air through heat exchange with the coolant;
a second coolant line configured to circulate the coolant, the second coolant line comprising:
a second heat exchanger connected in the air conditioning system so that coolant in the first coolant line can flow from an upstream end to a downstream end of a second air conditioning heat exchanger and then to an upstream end and to a downstream end of the first air conditioning heat exchanger, wherein:
the second heat exchanger is configured and positioned to exchange heat with the condenser of the refrigerant circuit, and
the second air conditioning heat exchanger is configured to adjust the temperature of the air conditioning air through heat exchange with the coolant; and
a first valve configured to selectively control the flow of coolant in the first coolant line at the upstream end of the first air conditioning heat exchanger; and
a controller configured to control the first valve in a heating mode so that coolant cooled by the first heat exchanger in the first coolant line flows to the first air conditioning heat exchanger and to the second air conditioning heat exchanger.

2. The air conditioning system of claim 1, wherein:
the first coolant line further comprises a first water pump, and
the second coolant line further comprises a second water pump and a coolant heater.

3. The air conditioning system of claim 1, wherein:
the second coolant line further comprises a first outdoor heat exchanger and a second valve, and
the coolant passing through the second heat exchanger selectively flows to a second air conditioning heat exchanger side or to a first outdoor heat exchanger side by the second valve.

4. The air conditioning system of claim 1, wherein the second coolant line further comprises a third valve configured to allow coolant passing through the second air conditioning heat exchanger on the downstream end of the second air conditioning heat exchanger to selectively flow to a first coolant line side or to a second heat exchanger side.

5. The air conditioning system of claim 4, wherein the controller is further configured to:
control the first valve in a cooling mode so that coolant cooled through the first heat exchanger in the first coolant line flows to the first air conditioning heat exchanger and to the second air conditioning heat exchanger; and
control the third valve so that coolant passing through the second air conditioning heat exchanger is recirculated to the first coolant line.

6. The air conditioning system of claim 4, wherein the controller is further configured to:
control the first valve in the heating mode so that coolant heated through the second heat exchanger in the second coolant line flows to the second air conditioning heat exchanger; and
control the third valve so that coolant passing through the second air conditioning heat exchanger is recirculated to the second heat exchanger.

7. The air conditioning system of claim 4, wherein:
the first coolant line further comprises a fourth valve and a fifth valve respectively provided on respective upstream ends and downstream ends of a second outdoor heat exchanger and the first heat exchanger; and coolant passing through the first heat exchanger selectively circulates to a first air conditioning heat exchanger side or to a second outdoor heat exchanger side by the fourth valve and the fifth valve.

8. The air conditioning system of claim 7, further comprising a third coolant line connected to the fourth valve and to the fifth valve of the first coolant line, wherein the third coolant line comprises a battery.

9. The air conditioning system of claim 8, wherein the second coolant line is branched from a branch pipe between the second heat exchanger and the first valve and is connected to the third coolant line via a sixth valve on an upstream end of the battery.

10. The air conditioning system of claim 8, wherein the third valve is a four-way valve configured to selectively circulate coolant to the second heat exchanger side, to a second air conditioning heat exchanger side, to a battery side, and to a first heat exchanger side.

11. The air conditioning system of claim 8, wherein:
the third valve is a three-way valve configured to selectively circulate coolant to the second heat exchanger side, to a second air conditioning heat exchanger side, and to a battery side;
the second coolant line comprises a branch line connected to the fifth valve of the first coolant line at the downstream end of the second air conditioning heat exchanger; and
the branch line comprises a seventh valve.

12. The air conditioning system of claim 1, further comprising a fourth coolant line branched from the first coolant line, wherein:
the fourth coolant line comprises an electronic component, a third outdoor heat exchanger, and an eighth valve, and
wherein coolant can selectively flow to the electronic component or to the third outdoor heat exchanger via the eighth valve.

\* \* \* \* \*